June 23, 1953  K. W. HALLDEN  2,642,937
CUTTING DEVICE OF THE MISS-CUT TYPE
Filed Aug. 7, 1948  4 Sheets-Sheet 1

Inventor
Karl W. Hallden
by Seymour, Earle & Nichols
Attorneys

June 23, 1953 K. W. HALLDEN 2,642,937
CUTTING DEVICE OF THE MISS-CUT TYPE
Filed Aug. 7, 1948 4 Sheets-Sheet 2

Inventor
Karl W. Hallden
By Seymour, Earle & Nichols
Attorneys

June 23, 1953  K. W. HALLDEN  2,642,937
CUTTING DEVICE OF THE MISS-CUT TYPE
Filed Aug. 7, 1948  4 Sheets-Sheet 3
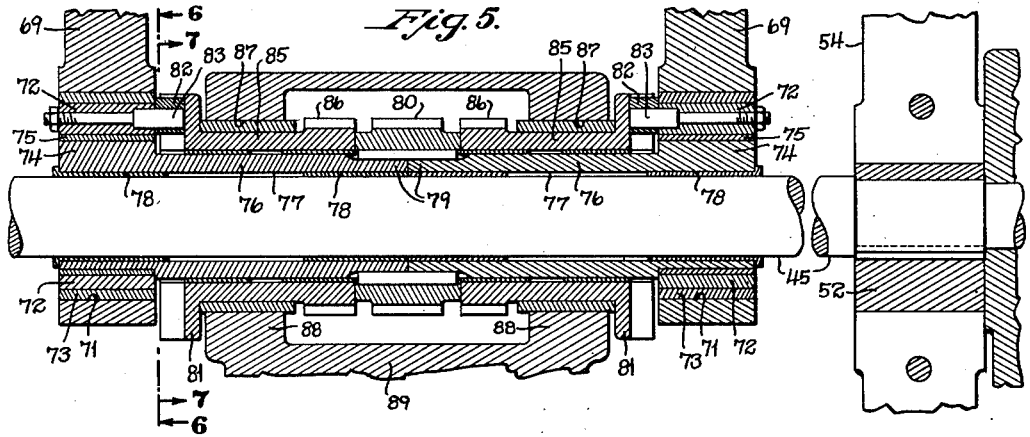
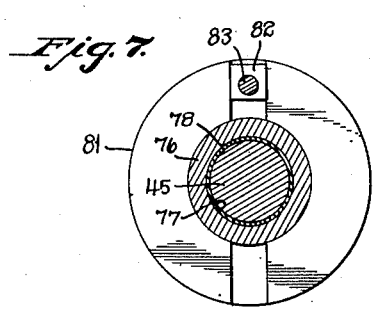
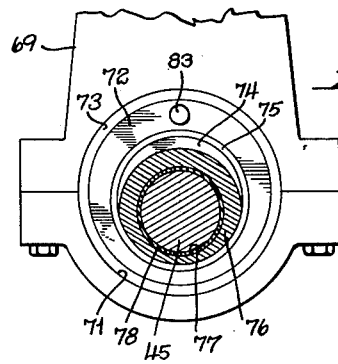
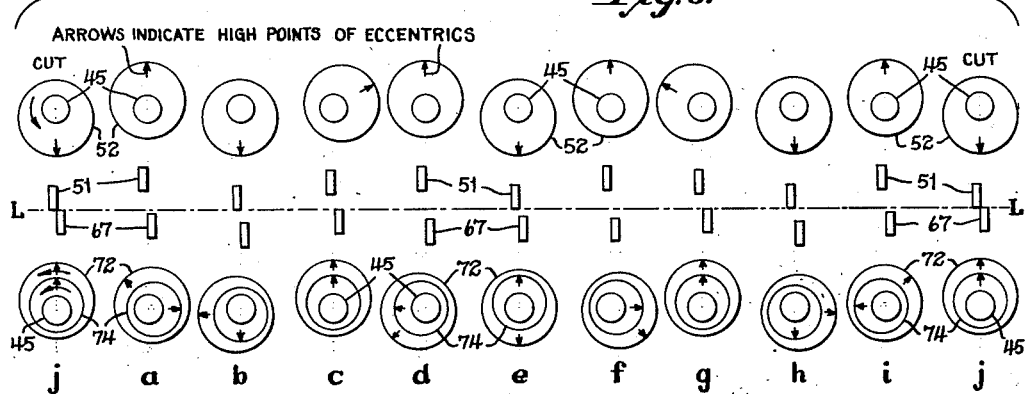
| PHASES OF FIG. 8 | NUMBER OF REVOLUTIONS | | | | | | | | | | |
|---|---|---|---|---|---|---|---|---|---|---|---|
| | j | a | b | c | d | e | f | g | h | i | j a |
| ECCENTRIC 52 | 4 | ½ | 1 | 1⅓ | 1½ | 2 | 2½ | 2⅔ | 3 | 3½ | 4 ½ |
| ECCENTRIC 72 | 9 | 1⅛ | 2¼ | 3 | 3⅜ | 4½ | 5⅝ | 6 | 6¾ | 7⅞ | 9 1⅛ |
| ECCENTRIC 74 | 6 | ¾ | 1½ | 2 | 2¼ | 3 | 3¾ | 4 | 4½ | 5¼ | 6 ¾ |
| | CUT | | | | | | | | | | CUT |
◄——— QUADRUPLE CUTTING CYCLE ———►
Fig. 9.
Inventor
Karl W. Hallden
by Seymour, Carter & Nichols
Attorneys June 23, 1953  K. W. HALLDEN  2,642,937
CUTTING DEVICE OF THE MISS-CUT TYPE
Filed Aug. 7, 1948  4 Sheets-Sheet 4

Inventor
Karl W. Hallden
By Seymour, Earle & Nichols
Attorneys

Patented June 23, 1953

2,642,937

UNITED STATES PATENT OFFICE 2,642,937

CUTTING DEVICE OF THE MISS-CUT TYPE

Karl W. Hallden, Thomaston, Conn.

Application August 7, 1948, Serial No. 43,149

6 Claims. (Cl. 164—49)

The present invention relates in general to cutting machines and more especially to a flying cutting-device in which stock, for example, a length of sheet material such as metal, plastic or paper, is continuously fed by feed-means to cutter-means which cuts the stock in predetermined lengths without interrupting the continuous feed of the stock. Although the machine hereinafter described is especially suitable for cutting substantially-flat metal stock, i. e., stock wherein its width greatly exceeds its thickness and which is hereinafter referred to as sheet stock, the flying cutting-device of this invention may be used with equal success in cutting stock in the form of bars or wires of round, hexagonal, rectangular or other cross section.

An object of the invention is to provide a flying cutting-device having superior means for controlling the relative movement of the cutting-blades during each cycle of the shear-frame, so as to secure a wide range of cut lengths of stock.

A further object of the invention is to provide a flying cutting-device having superior miss-cut mechanism for securing satisfactorily wide spacing of the cutting-blades between successive cutting cycles, so as to prevent deformation or other damage to the sheet stock being fed between the blades.

A further object of the invention is to provide a flying cutting-device with superior miss-cut mechanism for actuating one blade relative to the other between successive cycles of the shear-frame, so as to secure a relatively-high number of miss-cuts.

A still further object of the invention is to provide a flying cutting-device with superior miss-cut mechanism for actuating the cutting-blades, wherein the vertical displacement of one blade is substantially uniform throughout succeeding cycles of the shear-frame, whereas the vertical displacement of the second blade may be maintained either substantially uniform for cutting unit lengths of stock with each cycle of the shear-frame, or may be made to vary over a relatively-wide range during successive cycles of the shear-frame for securing a relatively-large number of miss-cuts, and with sufficient clearance between the upper and lower blades to prevent scratching the sheet stock.

A still further object of the invention is to provide a flying cutting-device with superior miss-cut mechanism characterized by multiple coacting eccentrics for actuating the lower cutting-blade and means for varying the angular relationship of the eccentrics, so as to control the vertical displacement of the lower blade with respect to the upper blade during each cycle of the shear-frame.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 5 is a sectional view on line 5—5 of Fig. 4;

Fig. 6 is a fragmentary left-side elevation of the eccentrics and the connecting-rod of the lower blade in the plane 6—6 of Fig. 5;

Fig. 7 is a fragmentary left-side elevation of the sliding-box mechanism in the plane 7—7 of Fig. 5 for controlling the movement of the outer eccentric relative to the inner eccentric;

Fig. 8 is a schematic view showing the relationship of the upper blade to the lower blade for various positions of one pair of the inner and outer eccentrics of the lower blade relative to each other and to the eccentric of the upper blade for securing three successive miss-cuts;

Fig. 9 is a chart showing, numerically, the number of revolutions and fractions thereof of the respective eccentrics when set to effect three successive miss-cuts, as indicated schematically in Fig. 8;

The present invention relates in particular to a superior miss-cut mechanism for a flying-cutter and is characterized by multiple coacting eccentrics for doubling, quadrupling and octupling the cut lengths of material, and although the miss-cut mechanism as described hereinafter is used in conjunction with drive-mechanism embodying an infinitesimally-adjustable speed-ratio unit and a step-gear unit of well known construction, it will be understood that this is only done for the purpose of illustrating one operable embodiment of the invention and that the improved miss-cut mechanism may be operable independently of the aforesaid units, or driven by any equivalent mechanism if so desired.

Figure 1:
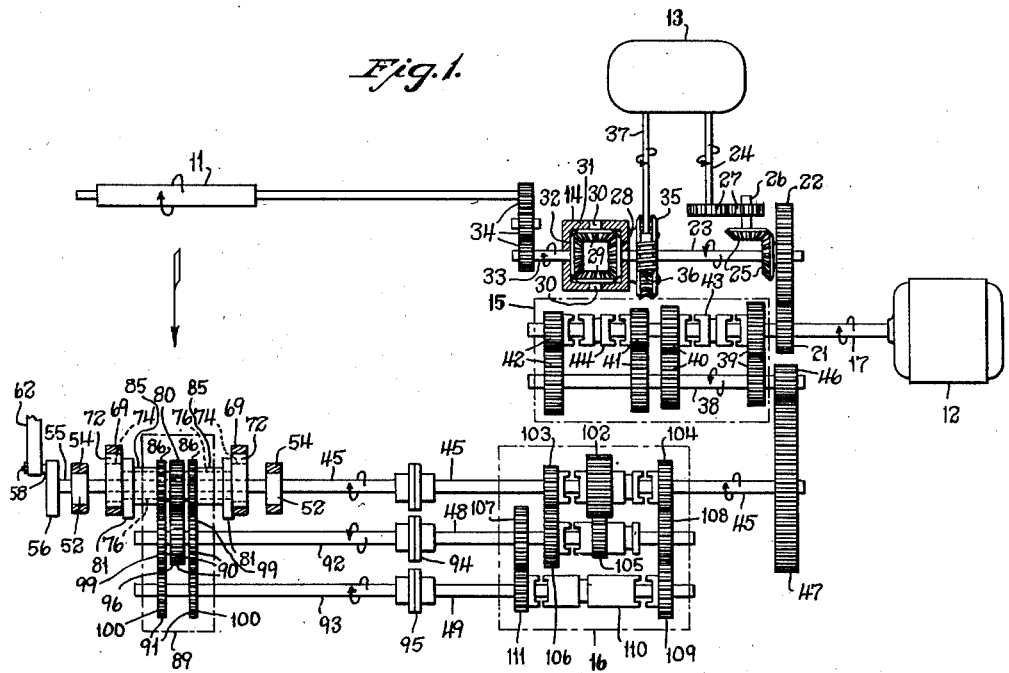
Fig. 1 is a schematic top plan view of one embodiment of the invention.
Figure 3:
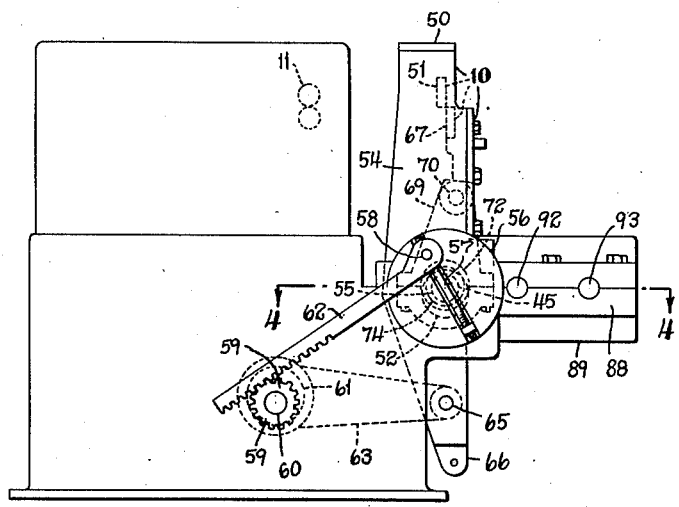
Fig. 3 is a left-side elevation of Fig. 2 showing details of the mechanism for synchronizing the horizontal speed component of the shear-frame with the speed of the stock at the instant of cutting.

Referring especially to Figs. 1 and 3 of the drawings which show an exemplary embodiment of the invention, the flying cutting-device illustrated includes a cutter-unit or -means 10 which in the particular form illustrated is a flying-shear known as a "guillotine" flying-shear; and feed-means in the form of feed-rolls 11. The cutting-means 10 and feed-means 11 are driven by drive-means in the form of an electric motor 12 through mechanism interconnecting the cutting-means 10 and feed-means 11. The aforementioned interconnecting mechanism includes an infinitesimally-adjustable speed-ratio unit 13, a differential gear-unit 14, a change-gear or step-gear unit 15 and a miss-cut gear-unit 16.

The details and mode of action of the units 13, 14 and 15 are more fully described in my previously granted Patents No. 2,144,307; No. 2,144,308; and No. 2,201,581, and will, therefore, only be described in sufficient detail in the present application to facilitate an understanding of the present invention.

The shaft 17 driven from the drive-motor 12 has secured thereto a pinion 21 in driving relation with a gear 22 secured to a shaft 23. The shaft 23 drives the input-shaft 24 of the infinitesimally-adjustable speed-ratio unit 13 through the pair of beveled gears 25, shaft 26 and a pair of spur-gears 27. The left end of the shaft 23 has a beveled gear 28 secured thereto which meshes with two beveled sun-gears 29 pivoted at 30 to the differential-housing 31, the gears 29 also meshing with a beveled gear 32 secured to a differential output-shaft 33 which, through suitable gearing 34, drives one of the feed-rolls 11, the two feed-rolls being geared together to rotate at equal speeds but in opposite directions, in the usual manner. The differential gear-unit 14 comprises the differential-gears 28, 29 and 32 and the differential-housing 31.

A worm-gear 35 is secured to the differential-housing 31 and meshes with a worm 36 secured to the output-shaft 37 of the infinitesimally-adjustable speed-ratio unit 13. The unit 13 is a commercial device known as a "P. I. V." made by the Link Belt Company of Philadelphia, Pennsylvania, and comprises a sprocket-chain arranged in driving relationship between two pairs of conical sprocket-wheels adapted to be moved toward and from each other for changing the relative speeds of the respective shafts to which they are connected. Structural details of the speed-ratio unit 13 are not shown in this application but are illustrated fully in the aforementioned patents. Most of the power transmitted from the shaft 17 to the feed-rolls 11 is transmitted through the differential-unit 14, only a minor portion of the power passing through the unit 13, which unit 13 can be set to transmit through the worm 36 and worm-gear 35 and desired speed of rotation to the differential-housing 31 within the range provided by the infinitesimal adjustability of the unit 13 to thus act as a control or governor for the differential-unit 14 to give any desired speed to the feed-rolls 11.

The shaft 17 is also adapted to drive a shaft 38 through any pair of the four pairs of selectively engageable change-gears or step-gears 39, 40, 41 and 42 by suitable actuation of one or the other of the splined clutch-members 43 or 44, to connect one of the gears 39, 40, 41 and 42 on the shaft 17, which are freely rotatable thereon, with one of the gears 39, 40, 41 and 42 on the shaft 38 which is keyed thereon in any way that is well known. The shaft 38 drives the main eccentric-shaft 45 of the shear-frame by means of the gears 46 and 47, the main eccentric-shaft 45 being adapted, in turn, to drive secondary eccentric drive-shafts 48 and 49 respectively of the gate, through the selectively engageable change-gears of the miss-cut gear-unit 16, in a way that will be explained more fully hereinafter.

Figure 2:
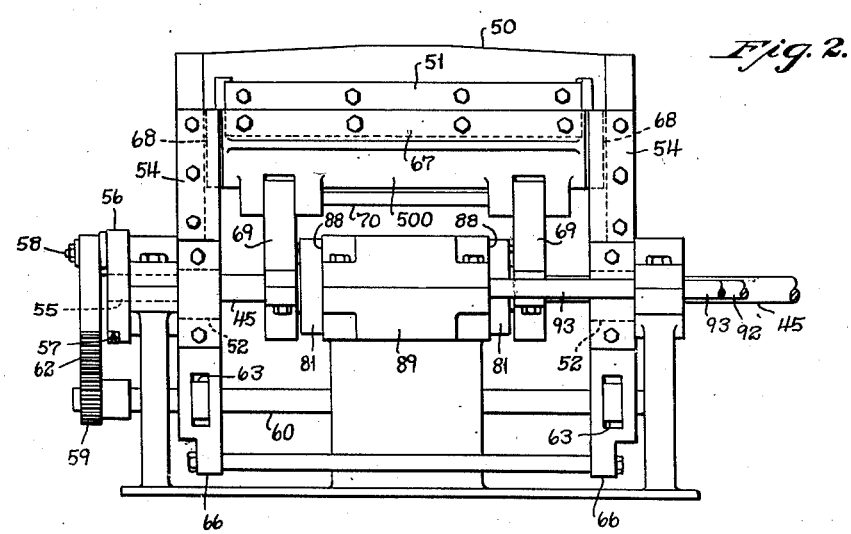
Fig. 2 is a broken front elevation of the cutting-device employed in connection with illustrating the superior miss-cut mechanism of this invention showing the upper and lower cutting-blades of the shear-frame.

Referring especially to Fig. 2, the main eccentric-shaft 45 drives the U-shaped shear-frame 50, including the upper cutting-blade 51 secured thereto, by means of the pair of transversely-spaced eccentrics 52 rotatably mounted in the lower ends of the respective arms 54 of the U-shaped shear-frame and keyed to the main eccentric-shaft 45 for rotation thereby, the main eccentric-shaft 45 being extended beyond the left-hand arm of the frame, as seen in Fig. 2, to provide a protruding end-portion 55 to support mechanism for synchronizing the horizontal speed component of the cutting-blades with the rate of feed of the stock at the moment the blades shear the stock.

As is characteristic of flying cutting-devices of this type, the rate of feed of the sheet material to the cutting-blades while variable, is adapted to be held substantially constant during any particular cutting operation and, consequently, by varying the time intervals between successive cycles of the oscillating shear-frame, the length of the sheet material being cut will vary correspondingly. Variations in time intervals between successive cycles of the shear-frame is accomplished to a limited extent by means of the pairs of change-gears 39, 40, 41 and 42 which provide means for varying the speed of rotation of the main eccentric-shaft 45 and, hence, the speed of oscillation of the shear-frame. Moreover, inasmuch as the rate of feed of the sheet material may also be varied by means of the infinitesimal adjustable speed-ratio unit 13 in conjunction with the differential gear-unit 14, the feed-rolls can have their speed varied by infinitesimal graduations covering the gaps between the pairs of step-gears 39, 40, 41 and 42. The electric motor 12 is preferably one the speed of which can be readily adjusted so that when the speed of feed of the feed-rolls 11 is lowered by an adjustment of unit 13 below a desired speed of output of cut stock, the speed of the motor can be adjusted to a higher speed so as to hold the rate of output substantially constant at all times if so desired.

It will be appreciated that in order to cut the sheet material in a manner to preclude buckling or scratching while it is moving continuously through the cutting-blades, the shear-frame 50 carrying the upper and lower cutting-blades must be moving in the direction of movement of the sheet material and at substantially the same speed horizontally at the instant of cutting, irrespective of the time interval between successive cycles of the frame.

A variety of means for varying the speed of travel of the shear-frame 50 in the direction of travel of the material being cut, so as to synchronize the speed of travel of the cutting-blades with the speed of travel of the material, may be provided, as illustrated in Patent No. 2,144,308 referred to above, and in the present embodiment one such synchronizing-means is shown which comprises a crank-disk 56 secured to the end-portion 55 of the main eccentric-shaft 45 concentric thereto and provided with a diametrical slot 57 for adjustably receiving a sliding-block having a crank-disk pin 58. Mechanism for interconnecting the pin 58 with the rack-pinion 59 of a shaft 60 which supports an eccentric 61 comprises a rack-arm 62 having rack-teeth engaged with the upper side generally of the rack-pinion 59 and pivotally connected at its upper end to the longitudinally-adjustable crank-disk pin 58. A driving-arm 63 is rotatably mounted on the aforesaid eccentric 61 and pivotally connected at 65 to an extension 66 of the shear-frame. In general, setting of the crank-disk pin 58 away from the center of the crank-disk 56 and on one side thereof serves to effect a characteristic auxiliary synchronizing oscillatory movement to the shear-frame, which movement may be used either to add to the oscillatory movement, which is provided by the eccentrics 52 of the main eccentric drive-shaft 45, or to subtract therefrom, depending upon which side of the center of the crank-disk 56 that the crank-pin 58 has been set. The foregoing description of the synchronizing-mechanism is of a cursory nature, inasmuch as a more detailed description is not necessary to an understanding of the present invention.

While the pairs of change-gears of the step-gear unit 15 and the speed-ratio unit 13 together with the synchronizing-mechanism provide admirably for cutting lengths of material ranging from a minimum length of 12 inches, hereinafter referred to as a "unit length," up to a maximum of 36 inches and by increments determined by the infinitesimal adjustments of the speed-ratio unit 13, the requirement for higher multiples of a unit length has been met by development of the so-called "miss-cut" mechanism wherein the lower cutting-blade is adapted to be moved vertically relative to the upper blade in a predetermined cutting sequence such that the lower blade will not always be in cutting relationship with the upper blade at the time the latter completes its cutting stroke, a circumstance hereinafter referred to as a miss-cut. Consequently, no cut will be made in the sheet material and the latter will continue to be fed between the vertically-spaced blades until such time as the blades complete their respective cutting strokes simultaneously.

Figure 4:
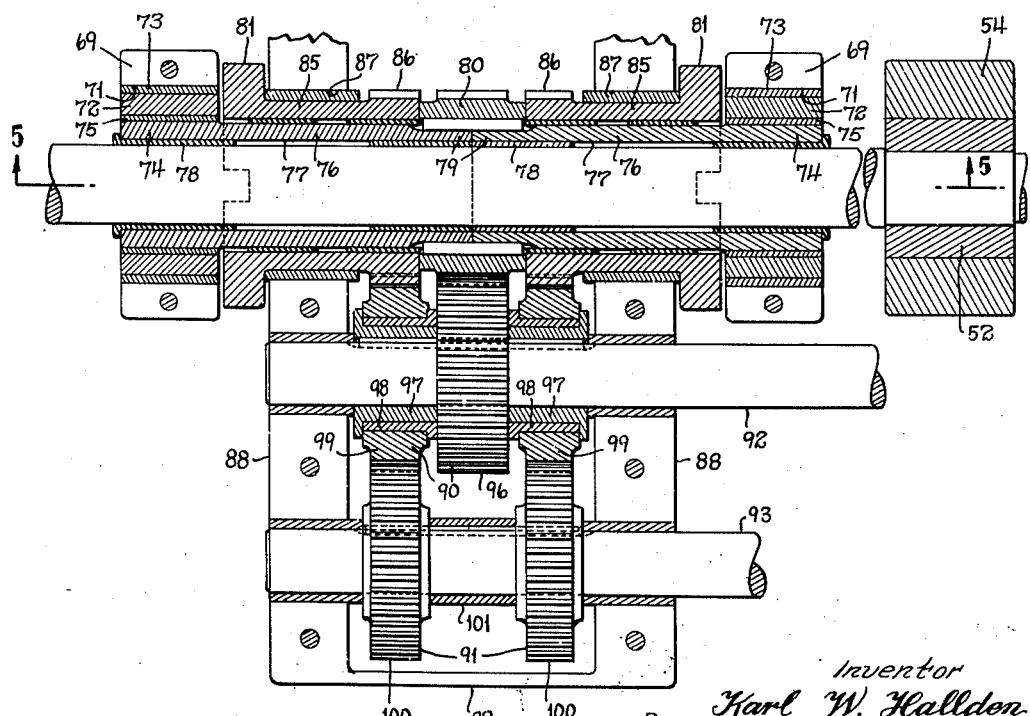
Fig. 4 is a broken horizontal sectional view partly in elevation on line 4—4 of Fig. 3 showing the superior miss-cut mechanism of this invention for actuating the lower blade relative to the upper blade.

As stated at the outset, the present invention is characterized by superior miss-cut mechanism which, in one embodiment, comprises multiple eccentrics for actuating the lower cutting-blade relative to the upper blade for securing not only a relatively-large number of miss-cuts, but maintaining the vertical spacing of the upper and lower cutting-blades sufficiently large to permit the sheet material to pass therebetween during miss-cut strokes, in particular, without being deformed or scratched. Referring especially to Fig. 2, the lower blade 67 is fixed to a gate 500 which is slidably supported in the shear-frame 50 by means of suitable gibs 68 for substantially vertical movement with respect to the upper blade 51, which, in turn, is fixedly secured to the upper part of the shear-frame. Each rod of a pair of connecting-rods 69 is pivotally connected at its upper end to the gate 500 along the bottom edge thereof and in transversely-spaced relationship by means of a pivot-rod 70, the lower ends of the respective connecting-rods 69 being provided with transversely axially-aligned apertures 71 of relatively-large diameter to accommodate ring-eccentrics 72 which are hereinafter referred to as the "outer," "secondary," or "complementary" eccentrics, as shown in Figs. 4, 5 and 6. In the preferred construction, a concentric floating-bushing 73 is interposed between the periphery of each outer eccentric 72 and the wall of its respective aperture 71. Rotatably mounted within each outer eccentric 72 is an "inner" or "primary" eccentric 74 preferably supported in spaced relationship to its respective outer or secondary eccentric by a concentric floating-bushing 75, each inner eccentric 74 constituting, in effect, the flanged head of a cylindrical sleeve 76 having a concentric bore 77, for accommodating the main eccentric-shaft 45 which projects therethrough and is adapted to be rotatably supported therein in circumferentially-spaced relationship by bushings 78, the oppositely-disposed ends of the cylindrical sleeves 76 being adapted to engage in abutting relationship substantially midway of the transversely-spaced connecting-rods. More particularly, the inner abutting end-portions 79 of the cylindrical sleeves 76 form a composite hub for supporting drive-means for the inner or primary eccentrics 74. In the present embodiment, the drive-means comprises a gear-wheel 80 which is adapted to be keyed to the composite hub in any suitable manner, thereby to positively rotate the pair of cylindrical sleeves 76, including the primary eccentrics 74 at the outer ends thereof, simultaneously and at identical speeds.

The drive-means for positively rotating the secondary or complementary eccentrics simultaneously and at identical speeds comprises a pair of diametrically-slotted crank-disks 81 each of which has a substantially-rectangular block 82 slidable longitudinally in its respective slot and mounted on a crank-pin 83 projecting inwardly from and carried by the adjacent secondary eccentric 72 (Fig. 5).

Each crank-disk constitutes an integral concentric flanged head at the outer end of a cylindrical crank-disk sleeve 85 rotatably assembled on the respective cylindrical sleeves 76 of the inner eccentrics 74, each crank-disk sleeve 85 extending inwardly of its respective outwardly-disposed crank-disk and terminating at its inner end in abutting relationship with the corresponding face of the gear-wheel 80. Further, the inner end of each crank-disk sleeve 85 is provided with an integral circumferential tooth-flange or gear 86 formed thereon for positively driving the corresponding crank-disks and their respective outer eccentrics 72, as hereinafter described.

The assembly, comprising the inner eccentrics 74 and their respective sleeves 76 and the crank-disks 81 and their respective sleeves 85, is rotatably supported in a bushed aperture 87 extending transversely through the side walls 88 of a housing-member 89. The side walls 88 project upwardly between the transversely-spaced connecting-rods 69 of the gate 500, the bearing-apertures 87 being in axial alignment with the main eccentric-shaft 45. The housing-member 89 accommodates the gear-wheel 80 of the inner eccentrics and the gears 86 of the crank-disks 81, and also accommodates two sets of gears for positively driving, respectively, the gear-wheel 80 and the gear-wheels 86.

The two sets of gears referred to above are indicated generally at 90 and 91 respectively, and are supported on the ends of a pair of drive-shaft extensions 92 and 93 respectively, secured at their opposite ends and in axial alignment with the aforementioned secondary drive-shafts 48 and 49 of the inner and outer eccentrics respectively, by means of couplings 94 and 95.

The set of gears 90 of the eccentric drive-shaft extension 92 consists of a center spur-gear 96 keyed to the shaft-extension 92 and adapted to mesh with the gear-wheel 80 of the primary eccentrics for driving the same, the center gear 96 and the gear-wheel 80 being in the ratio of 1:1. Arranged on opposite sides respectively of the center spur-gear 96 is a pair of flanged hub-members 97 similarly keyed to the shaft-extension 92, each flanged hub-member 97 having a flanged bushing 98 rotatable freely thereon and constituting a bearing for supporting an idler-gear 99 adapted to mesh with the corresponding gear 86 of the respective crank-disks for rotating the latter, including the secondary or complementary eccentrics 72 connected thereto.

The set of gears 91 of the eccentric drive-shaft extension 93 comprises a pair of spur-gears 100 keyed to the shaft-extension 93 and held in laterally-spaced relationship by means of a spacing-sleeve 101 so as to mesh with the idler-gears 99 of the drive-shaft extension 92, the spur-gears 100 and idler-gears 99 being in the ratio of 1:1.

In accordance with this construction, the secondary eccentric drive-shafts and their respective extensions 92 and 93 may be driven at equal speeds, in which instance the spur-gears 100 of the shaft-extension 93 will drive the idler-gears 99 of the shaft-extension 92 at the same speed as that of their respective hub-members 97 which, together with the center spur-gear 96, are being positively driven by the shaft-extension 92. Consequently, both the primary eccentrics and the secondary or complementary eccentrics will be driven at the same speed. On the other hand, when either one of the two drive-shaft extensions 92 and 93 respectively is driven at a greater or lesser speed than that of the other, in the manner hereinafter described, the idler-gears 99 being positively driven by the spur-gears 100 of the shaft-extension 93 will rotate relative to their respective hub-members 97 and the center gear 96 of the shaft-extension 92, whereby the gears 86 which drive the secondary eccentrics 72 are driven at a greater or lesser speed than the gears which drive the primary eccentrics 74, as the case may be, so as to effectively rotate the primary eccentrics relative to the secondary or complementary eccentrics. In the present embodiment, the eccentricity of each secondary or complementary eccentric is substantially one-half inch, while the eccentricity of each primary or inner eccentric is substantially three-fourths inches. As pointed out above, an important feature of the improved miss-cut mechanism of this invention is that by employing the multiple-eccentric construction hereinabove described, the upper and lower blades are adapted to be held in vertically-spaced relationship, during miss-cuts, a distance vertically which is sufficient to permit the sheet material to pass therebetween without likelihood of being scratched by either the upper or lower blade, this highly desirable and characteristically new result being achieved by selecting the eccentricities above mentioned for the primary and secondary eccentrics, in conjunction with the selective speed-change gears of the miss-cut drive-mechanism 16, as hereinafter described.

Referring again to Fig. 1, and especially to the miss-cut drive-mechanism 16, the gear-trains of the speed-change gears comprise a main drive-gear 102 keyed to the main eccentric-shaft 45 but slidable longitudinally thereon for clutching with the gears 103 and 104 rotatably mounted on the shaft 45 on opposite sides respectively of the main gear 102. The latter is adapted to mesh with a gear 105 rotatable freely on the secondary drive-shaft 48 of the inner eccentric and to slide longitudinally thereon for clutching with a spur-gear 106 keyed to the secondary drive-shaft 48 to the left of the gear 105, as seen in Fig. 1. A second spur-gear 107 is keyed to the secondary drive-shaft 48 to the left of the spur-gear 106, while on the right-hand side of the gear 105 is a third spur-gear 108 keyed to the shaft 48 and adapted to mesh with a spur-gear 109 rotatable freely on the secondary drive-shaft of the outer eccentric 49. The spur-gear 109 is adapted to be keyed to the secondary drive-shaft 49 by means of a longitudinally-slidable clutch-member 110 which, in turn, is splined to the secondary drive-shaft 49 and adapted to connect a second spur-gear 111 thereto, the latter being normally freely rotatable thereon and in mesh with the spur-gear 107 of the secondary drive-shaft 48.

In the present embodiment, the particular gear ratios of the miss-cut change-gears above identified have been selected for producing no miss-cuts, one miss-cut, three successive miss-cuts, or seven successive miss-cuts, whereby a unit length of stock and whole or fractional multiples thereof as determined by the speed-ratio unit 13 and step-gear unit 15, may be doubled, quadrupled or octupled. To these ends, the ratio of the gear 105 to the gear 102 is 1½:1, the gears 108 and 109 are each in the ratio of 1:1, while the gear 106 is in the ratio of ¾:1, and the gear 111 is in the ratio of 1½:1. Thus, for example, to effect a non-multiple length of cut, the lower cutting-blade 67 must move through its cutting cycle at the same speed as that of the upper blade 51, and hence the main gear 102 is moved to the right on the main eccentric drive-shaft 45 into clutching engagement with the spur-gear 104, whereupon the latter is driven by the main eccentric drive-shaft 45 and, in turn, drives the interconnected gears 108 and 109 of the secondary drive-shafts 48 and 49 respectively. Since the gear 108 is keyed to the shaft 48 and the gear 109 is adapted to be keyed to the shaft 49 by shifting the clutch-member 110 therealong, the 1:1 ratio of the gears 108 and 109 rotates the eccentric drive-shafts and their respective extensions 92 and 93 at identical speeds equal to the speed of rotation of the main eccentric-shaft 45. Now, since the sets of gears 90 and 91 of the respective secondary drive-shaft extensions are adapted to drive the respective primary and secondary eccentrics of the gate of the lower blade in a speed ratio of 1:1 as hereinabove described, the aforesaid eccentrics will also be rotated at a speed equal to that of the main eccentric drive-shaft 45 which oscillates the frame and upper blade 51. Furthermore, with the primary and secondary eccentrics set with the high point of each in additive relationship at the moment the upper cutting-blade 51 is at the bottom of its cutting stroke, the lower cutting-blade 67 will have also arrived at the upper limit of its cutting stroke simultaneously with the upper blade. Consequently, with each oscillatory movement of the shear-frame, a length of stock will be cut from the continuously-moving strip of sheet material which is a non-multiple of the length of stock obtainable by selected settings of the change-gears 15 and the variable speed-unit 13, as hereinabove described.

In order to double a unit length of stock or multiple thereof, one miss-cut is used and to this end the gear 105 of the miss-cut change-gears 16 is adapted to be moved longitudinally on the shaft 48 into clutching engagement with the spur-gear 106 for effecting rotation of the secondary drive-shaft 48 and the gear 108 keyed thereto. The latter rotates the spur-gear 109 which, on being keyed to the secondary driveshaft 49 by the clutch-member 110, rotates the shaft 49. Since the ratio of the gears 102 and 105 is 1½:1, while the gear-ratio of the gears 108 and 109 is 1:1, the gears 108 and 109 rotate the respective secondary drive-shafts 48 and 49 of the inner and outer eccentrics respectively at equal speeds, but substantially one and one-half times faster than the speed of the main eccentric drive-shaft 45. Again, the high points of both the inner and outer eccentrics will rotate in additive relationship since both eccentrics are being rotated at substantially-equal speeds. However, since the eccentrics which drive the gate of the lower blade 67 are rotating one and one-half times faster than the speed of rotation of the eccentrics which drive the frame and upper blade 51, the lower cutting-blade will be at the bottom of its cutting stroke when the upper blade completes its first cutting stroke and will be at the upper limit of its cutting stroke simultaneously with the completion of the cutting stroke of the upper blade only on the second or alternate cutting stroke of the latter, as a consequence of which the length of material which passes between the cutting-blades between successive cuts is doubled.

Referring particularly to Fig. 8, the latter is a diagrammatic illustration of the relative positions of the upper and lower blades for corresponding revolutions or fractions thereof of one eccentric of the single pair of eccentrics of the upper blade and one pair of the two pairs of eccentrics of the gate for effecting three successive miss-cuts, i. e., for quadrupling a unit length of cut. To this end, the gear 105 is moved to the left in clutching engagement with the gear 106 to drive the secondary shaft 48 at one and one-half times the speed of the main eccentric driveshaft 45. The gear 107 will be driven by the secondary drive-shaft 48 and hence will drive the gear 111 which is adapted to be keyed to the secondary drive-shaft 49 by the clutch 110, and inasmuch as the ratio of the gear 107 to the gear 111 is 1½:1, then for each revolution of the eccentrics 52 of the main eccentric drive-shaft 45, the inner eccentric 74 of the secondary driveshaft 48 will make one and one-half revolutions, while the outer eccentric 72 of the secondary drive-shaft 49 makes two and one-quarter revolutions. Thus, with the high points of the inner and outer eccentrics in additive relationship, i. e., uppermost, when the eccentric of the upper blade is at its low point, as indicated at phase j of the quadrupling cutting cycle shown in Fig. 8, the blades will be in cutting position. Then on completion of one-half revolution of the eccentric 52 of the upper blade, the latter will be in its uppermost position and the inner eccentric 74 of the lower blade will have been rotated three-quarters of a revolution, while the outer or secondary eccentric 72 of the lower blade will have been rotated one and one-eighth revolutions.

At the end of one complete revolution of the eccentric of the upper blade, the latter will be at its low point for cutting. However, the inner eccentric will have been rotated one and one-half revolutions while the outer or secondary eccentric will have been rotated two and one-quarter revolutions. Thus, the high points of the eccentrics are not in additive relationship and hence the lower blade will not be in its uppermost position for cooperating with the upper shear-blade but will be spaced vertically therefrom so that no cutting or shearing action takes place, the vertically-spaced relationship of the upper and lower blades constituting the first miss-cut. The successive revolutions and fractions thereof of the eccentric of the upper blade and the inner and outer eccentrics of the lower blade may be followed through successive phases a–j of the diagram, from which it will be seen that the lower blade makes three miss-cuts before the upper and lower blades complete a cutting stroke simultaneously to shear the sheet material being fed therethrough, successive cut lengths of material being quadruple a unit length or any whole or fractional multiple thereof obtained by selected settings of the speed-ratio unit and step-gear unit. As indicated numerically in the chart of Fig. 9, on completion of the (j) phase of the cutting cycle the eccentric of the upper blade will have completed four revolutions, while the inner eccentric 74 will have completed six revolutions and the outer eccentric 72 will have completed nine revolutions.

As pointed out earlier, the multiple pairs of eccentrics have been found to provide not only a relatively large number of miss-cuts and hence high multiples of a unit length of cut but also to insure satisfactorily wide spacing vertically of the upper and lower blades between successive cutting strokes so as to preclude scratching or disfiguring the sheet material being fed therethrough. This circumstance is illustrated graphically in Fig. 8 by the vertical displacement of the upper and lower cutting blades respectively with respect to a median or shearing line L—L for successive revolutions and fractions thereof of the eccentrics. By selecting an eccentricity of substantially six-eighths inches and substantially one-half inches respectively for the inner and outer eccentrics of the lower blade and an eccentricity of substantially one and three-eighths inches for the eccentric of the upper blade in conjunction with the gear ratios of the miss-cut gear-unit 16 described above, the upper and lower blades will be found to remain spaced apart vertically a minimum distance of substantially three-fourths inches at the most critical point in the entire range of cut lengths covered by the doubling, quadrupling and octupling misscut mechanism in conjunction with the infinitesimally-adjustable speed-ratio unit and the step-gear unit above described.

For octupling the length of cut, the gear 102 is shifted to the left on the main eccentric driveshaft 45 to couple the spur-gear 103 thereto, whereupon the spur-gear 103 drives the spurgear 106 in the ratio of ¾:1. The spur-gear 106 being keyed to the secondary drive-shaft 48 by the clutch 105 drives the shaft 48 at a similar speed relative to the main eccentric drive-shaft, together with the spur-gear 107 which, in turn, drives the spur-gear 111. By coupling the latter to the secondary drive-shaft 49 by means of the clutch-element 110, the secondary drive-shaft 49 will be rotated in the ratio of ⅜:1. The rotational relationship between the eccentric of the upper blade and the inner and outer eccentrics of the lower blades may be represented diagrammatically similarly to the diagrammatic illustration of Fig. 8, whereby it will be found that seven miss-cuts occur before the upper and lower blades are moved together simultaneously to shear the material being fed therethrough, the eccentric of the upper blade being rotated through eight complete revolutions while the inner eccentric of the lower blade will have completed six revolutions and the outer eccentric of the lower blade will have completed nine revolutions.

Although the particular gear-ratios of the miss-cut change-gear unit 16 have been selected to rotate the inner and outer eccentrics of the lower blade in angular relationship such as to produce double, quadruple and octuple length cuts, it will be understood that it is within the purview of this invention to select gear-ratios for the miss-cut gear-unit 16 such that the inner and outer eccentrics will effect triple, sextuple, and duodenary length cuts.

The description thus far of the characteristic action of the miss-cut gear-unit and its pair of inner and outer eccentrics has been related only inferentially to the capacity of the miss-cut gear-unit 16 when used in conjunction with the infinitesimally-adjustable speed-ratio unit 13 and the step-gear unit 15 of the machine.

By way of illustrating the joint action of the aforesaid units with the improved miss-cut mechanism of this invention, let it be assumed that the speed-ratio unit 13 is set so that it exercises maximum governing effect on the differential-gear unit 14 to produce a minimum rate of feed when driven by the motor 12 through the interconnected shaft 17, spur-gear 22 and shaft 23. The feed-rolls 11 will, therefore, feed sheet material to the cutting-blades of the shear-frame at its minimum speed. Assuming, further, that the step-gear unit 15 is set so as to drive the main eccentric drive-shaft 45 at a speed such as to produce unit lengths of cut material, and that the miss-cut gear-unit 16 is set in its normal position, that is to say, with the secondary drive-shafts 48 and 49 respectively coupled to the main eccentric drive-shaft 45 in the ratio of 1:1 such that all three secondary drive-shafts are rotated at the same speed, then, under these circumstances, the upper and lower blades of the shear-frame will complete their respective cutting strokes simultaneously and with each oscillation of the shear-frame. Assuming, further, that the crank disk-pin 58 of the synchronizing-mechanism is set in a position so that the shear-frame will be oscillated by the main eccentric-shaft at a speed such that its horizontal component is equal to the rate at which the sheet material is being fed between the upper and lower blades, then the blades will cut a unit length of material with each oscillation of the shear-frame. Now, should it be desirable to increase the unit length of cut, this may be accomplished by speeding up the rate of feed while maintaining the time interval, between successive cuts substantially constant and increasing the speed of oscillaiton of the shear-frame at the time of cut. For effecting relatively small increases in the unit length of cut, the P. I. V. speed-ratio unit will suffice. It will be appreciated, however, that whenever the rate at which material is fed to the cutting-blades is changed, an adjustment must be made in the synchronizing-mechanism so that the horizontal component of speed of the shear-frame will, at the instant of cutting, be equal to the rate at which material is being fed between the cutters, even though the over-all time interval between successive oscillations of the shear-frame remains unchanged.

Should it be desirable to increase the length of cuts beyond the range of the P. I. V. speed-ratio unit, the latter may be reset to effect a minimum feed, as hereinabove described, and one of the four sets of gears of the step-gear unit 15 may be shifted to drive the main eccentric-shaft and hence the shear-frame at a slower speed. Again, the synchronizing-mechanism must be adjusted so that the horizontal component of motion of the shear-frame at the instant of cutting will be equal to the rate of feed of material to the cutting-blades.

In step-gear units of the type described herein and widely used in flying cutting-devices, the gear-ratios of the gears permit changes in the speed of rotation of the main eccentric-shaft such as to double and triple a unit length of cut, the range of the P. I. V. speed-ratio unit 13 covering the gaps or steps between the step-gears so as to obtain fractions of these multiple lengths of cut.

When a length of cut is required which is still longer than that which can be obtained with the speed-ratio unit and the step-gear unit, the miss-cut unit 16 is employed, in the manner hereinabove described, and as used in conjunction with the speed-ratio unit and step-gear unit may accomplish extremely high multiples of a unit length of cut or any whole or fractional multiple thereof. Thus, by way of illustration, to quintuple a unit length of cut, the P. I. V. speed-ratio unit 13 is set to feed one unit length, the step-unit 15 is set for two and one-half times a unit length of cut, and the miss-cut unit 16 is set for doubling, i. e., for one miss-cut. With the first revolution of the main eccentric drive-shaft, the upper blade completes its cutting stroke while a two and one-half unit length of material is fed between it and the lower blades. The latter, however, makes a miss-cut, the two blades completing their cutting strokes simultaneously only at the end of the second revolution of the main eccentric-shaft, as a consequence of which the cut length of material is twice a two and one-half unit length of cut or five unit lengths.

Similarly, by selecting proper settings of the P. I. V. speed-unit 13 and the step-gear unit 15 in conjunction with the miss-cut unit 16 having capacity for doubling, quadrupling and octupling the lengths of cut obtainable by the aforesaid speed-ratio and step-gear units through the use of miss-cuts, extremely high multiples of a unit length of cut may be secured both in large steps and by increments corresponding to the infinitesimal adjustments of the speed-ratio unit 13.

Figure 10:
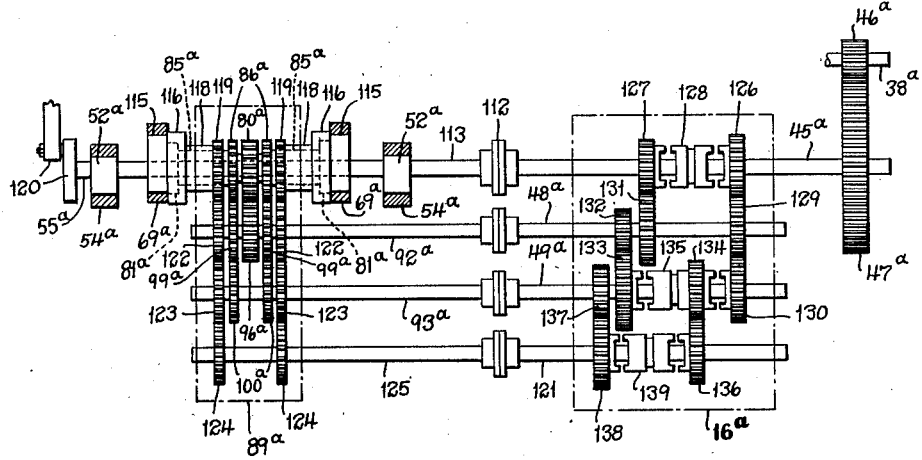
Fig. 10 is a broken schematic top plan view in section of a modification of the miss-cut mechanism of this invention wherein three mutually-coacting eccentrics serve to operate the lower cutting-blade.
Figure 11:
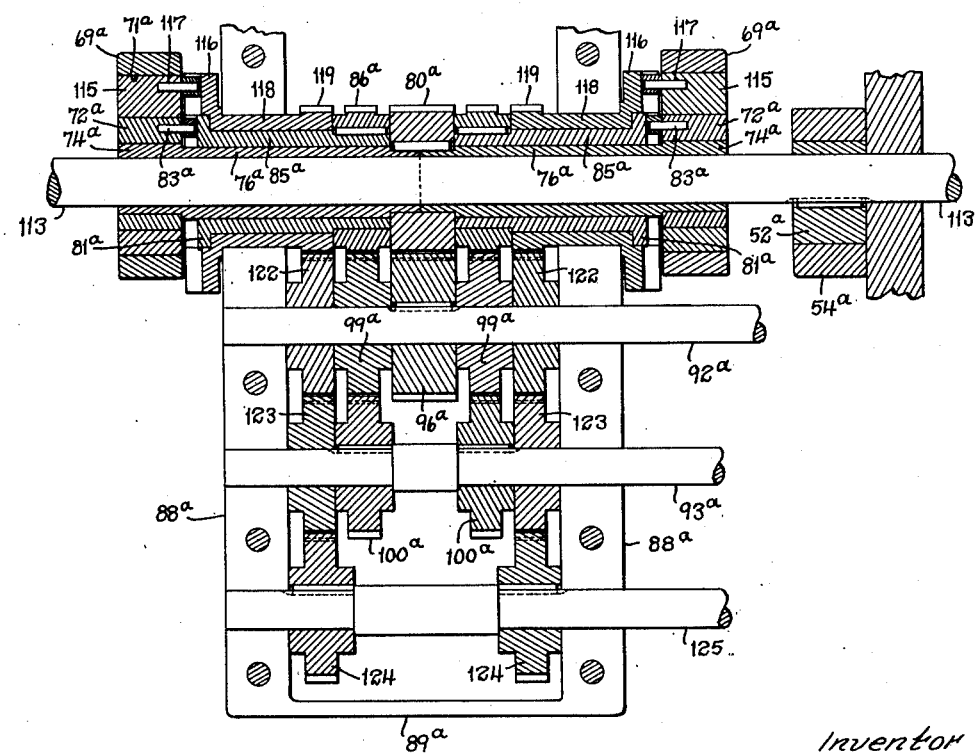
Fig. 11 is an enlarged broken sectional view similar to Fig. 4 but showing the three eccentrics of the lower blade and the drive-means thereof, of Fig. 9.

A modification of the invention is illustrated in Figs. 10 and 11 wherein are illustrated structural details of a miss-cut drive-mechanism 16a adapted to provide as high as eight successive miss-cuts, that is to say, to form cut lengths of stock substantially nine times a unit length.

To this end, the main eccentric-shaft 45a of the miss-cut gear-unit 16a is connected by means of a coupling 112 to an extension 113 of the main eccentric drive-shaft, the extension 113 being rotatably supported by the drive-mechanism of the two sets of triple eccentrics. The triple eccentrics of each set of eccentrics are indicated at 74a, 72a and 115 respectively, mounted in mutually-coacting relationship within suitable apertures 71a at the lower ends of the connecting-rods 69a of the gate. As in the disclosure of Fig. 5, each inner eccentric 74a, hereinafter referred to as the "primary" eccentric, constitutes a flange of a cylindrical sleeve 76a rotatably mounted on the shaft-extension 113, the inner ends of the respective sleeves 76a abutting each other and providing a compound hub on which a gear-wheel 80a is keyed. The secondary eccentrics 72a constitute ring-like members rotatably mounted on the primary eccentrics 74a, each driven by a crank-mechanism constituting a crank-disk 81a having a diametrically-slidable crank-pin 83a mounted therein, and an integral crank-disk sleeve 85a. The latter are rotatably assembled on the corresponding cylindrical sleeves 76a of the primary eccentrics and are provided with gears 86a keyed to the inner ends of the respective sleeves 85a on opposite sides respectively of the gear-wheel 80a.

The tertiary eccentrics 115 are also ring-like members rotatably mounted on the respective peripheries of the secondary eccentrics 72a, each tertiary eccentric being driven relative thereto by an assembly comprising a crank-disk 116 having a diametrically-slidable crank-pin 117 mounted therein, and a crank-disk sleeve 118. The latter are rotatably mounted on the corresponding sleeves 85a of the secondary eccentrics 72a, the inner ends of the sleeves 118 being provided with integral toothed flanges 119 respectively, constituting drive-gears therefor. Although not shown in the Figs. 10 and 11, it will be understood that floating-bushings may be provided between adjacent surfaces of the eccentrics and between the tertiary eccentrics and the corresponding apertures 71a of the connecting-rods 69a of the gate. As shown schematically in Fig. 10, the extension 113 of the main drive-shaft is provided with a pair of eccentrics 52a secured thereto on opposite sides respectively of the two sets of triple eccentrics and rotatably engaged in suitable bearing-apertures in the lower ends of the respective arms 54a of the shear-frame, for oscillating the latter including the gate slidably mounted thereon as hereinabove described. The extension 113 of the main eccentric drive-shaft is also provided with an outer end-portion 55a for accommodating synchronizing-mechanism, indicated generally at 120, a detailed description of which is given above.

The aforesaid gears 80a, 86a and 119 respectively of the two sets of triple eccentrics are adapted to be driven by the secondary drive-shafts 48a, 49a and 121 respectively of the miss-cut change-gear drive-mechanism 16a, the gear-wheel 80a of the primary eccentrics 74a being driven by a gear-wheel 96a keyed to an extension 92a of the secondary drive-shaft 48a. The latter also supports a first and second pair of idler-gears 99a and 122 respectively, rotatably mounted on opposite sides respectively of the gear 96a and adapted to mesh with the two pairs of gears 86a and 119 respectively of the secondary and tertiary eccentrics, the gear-ratios of the respective pairs of gears being 1:1. The first pair of idlers 99a is adapted to be driven by a first pair of drive-gears 100a keyed to an extension 93a of the secondary drive-shaft 49a, the shaft-extension 93a having a third pair of idlers 123 rotatable freely thereon and adapted to mesh with the aforesaid second pair of idler-gears 122 and with drive-gears 124 keyed to an extension 125 of the secondary drive-shaft 121, the gear-ratios of the respective pairs of drive-gears and their corresponding idlers being 1:1.

Thus, the secondary drive-shaft 48a of the miss-cut drive-mechanism 16a is adapted to drive the primary eccentrics 74a; the secondary drive-shaft 49a to drive the secondary eccentrics 72a, and the secondary drive-shaft 121 to drive the tertiary eccentrics 115. In the present embodiment, the eccentricity of each eccentric of each set of three eccentrics is substantially ⅜" which, with the gear-ratios hereinafter described of the miss-cut drive-mechanism 16a, has been found to provide optimum vertical spacing of the upper and lower cutting-blades throughout the entire range of miss-cuts such that the sheet stock is permitted to pass between the blades without being scratched or otherwise disfigured.

Referring more especially to Fig. 10, the change-gears of the miss-cut drive-mechanism 16a comprise a pair of gears 126 and 127 respectively, rotatably mounted on the main eccentric drive-shaft 45a and adapted to be keyed thereto by a double-ended clutch-member 128 splined to the shaft 45a. The gear 126 is adapted to mesh with a gear 129 keyed to the secondary drive-shaft 48a. The gear 129 is, in turn, in mesh with a gear 130 rotatably mounted on the secondary drive-shaft 49a, the gears 126, 129 and 130 being in the ratio of 1:1. The aforesaid gear 127 of the main eccentric drive-shaft 45a is in mesh with a gear 131 keyed to the secondary drive-shaft 48a, the drive-ratio between the gears 127 and 131 being ⅔:1. A third gear 132 is keyed to the secondary drive-shaft 48a and is in mesh with a drive-gear 133 rotatably mounted on the secondary drive-shaft 49a, the drive ratio between the gear 132 and 133 being ½:1. The secondary drive-shaft 49a also carries a combined drive-gear 134 and clutch 135 splined thereto, whereby the aforesaid rotatable gear 130 may be connected to the clutch-gear 134 so as to positively drive the secondary drive-shaft 49a and hence a gear 136 rotatably mounted on the secondary drive-shaft 121 and in mesh with the clutch-gear 134, the latter and the gear 136 being in the ratio of 1:1. The clutch 135 of the secondary drive-shaft 49a is adapted also to connect the rotatable gear 133 to the secondary drive-shaft 49a, thereby to positively rotate a gear 137 keyed thereto and in mesh with a gear 138 rotatably mounted on the secondary drive-shaft 121, the gears 137 and 138 being in the ratio of ⅔:1. Rotation of the gears 136 and 138 respectively is adapted to be transmitted to the secondary drive-shaft 121 by means of a double-ended clutch 139 splined thereto. Thus, to drive the secondary drive-shafts from the main eccentric drive-shaft 45a at substantially identical speeds, so that the two sets of triple eccentrics will reciprocate the lower blade into cutting relationship with the upper blade with each oscillation of the shear-frame and thereby form single length cuts, the clutch 128 of the miss-cut gear-change mechanism 16a is moved to the right on the main eccentric drive-shaft 45a to clutch the gear 126 thereto. The gear 126 meshing with the gear 129 rotates the latter which, in turn, rotates the gear 130 rotatably mounted on the secondary drive-shaft 49a. By sliding the clutch-gear 134 thereof to the right so as to engage the gear 130, the latter drives the clutch-gear 134 which, in turn, drives the gear 136. By sliding the clutch 139 to the right, the gear 136 is adapted to positively rotate the secondary drive-shaft 121. Since the gear-ratios of the gears 126, 129, 130, 134 and 136 are 1:1, then the three secondary drive-shafts 48a, 49a and 121 will be driven at substantially identical speeds from the main eccentric drive-shaft 45a.

Should it be desirable to provide for cut lengths substantially three times a unit length, the clutch 128 is moved to the left to engage the gear 127 with the main eccentric drive-shaft 45a, the gear 127 meshing with the gear 131 which is keyed to the secondary drive-shaft 48a, thereby driving the gear 132 which is keyed thereto and in mesh with the gear 133 rotatably mounted on the secondary drive-shaft 49a. By moving the clutch 135 to the left, the gear 134 thereof is driven and, in turn, drives the gear 133 of the secondary drive-shaft 121. By moving the clutch 139 to the right to connect the gear 136 thereto, the secondary drive-shaft 121 will rotate one complete revolution for every three complete revolutions of the main eccentric drive-shaft 45a, the secondary drive-shaft 48a rotating twice and the secondary drive-shaft 49a rotating once. Thus, assuming the high points of each eccentric of the two pairs of triple eccentrics 114 being uppermost at the time the upper and lower blades are in cutting relationship, then on completion of one revolution of the main eccentric drive-shaft 45a, the upper cutting blade will be in position for cutting, but the lower blade will not have risen into cutting relationship therewith inasmuch as the primary eccentric 74a will have rotated only two-thirds of a revolution, while the secondary and tertiary eccentrics 72a and 115 will have rotated only one-third of a revolution. Consequently, a miss-cut is made. At the end of the second complete revolution of the main eccentric drive-shaft 45a, the primary eccentric 74a will have rotated one and one-third revolutions, while the secondary and tertiary eccentrics will have rotated two-thirds of a revolution. Again, the lower cutting-blade will not be in cutting relationship to the upper cutting-blade and hence a second miss-cut occurs. On the third complete revolution of the main eccentric drive-shaft 45a, the primary eccentric 74a will have completed two revolutions, while the secondary and tertiary eccentrics will have completed one revolution. Hence, the high points of all there eccentrics of each set of eccentrics will coincide and, therefore, the lower blade will be raised into cutting relationship with the upper blade to shear the sheet stock being fed therebetween.

Should it be desirable to form a cut length of stock substantially nine times the unit length, then eight miss-cuts must occur, which is effected by shifting the clutch 128 to the left to clutch the gear 127 to the main eccentric drive-shaft 45a, thereby driving the gear 131 keyed to the shaft 48a. The gear 132, likewise keyed to the shaft 48a, thereby drives the gear 133, and by shifting the clutch 135 to the left, the shaft 49a and the gear 137 keyed thereto are rotated, the gear 137, in turn, rotating the gear 138 which is adapted to be keyed to the shaft 121 by shifting the clutch 139 to the left. The gear-ratios of the gears 127 and 131 being ⅔:1, the gear-ratios of the gears 132 and 133 being ½:1, and the gear-ratios of the gears 137 and 138 being ⅔:1, it follows that the main eccentric drive-shaft 45a must complete nine revolutions before the secondary drive-shafts 48a, 49a and 121 respectively, have rotated their respective primary, secondary and tertiary eccentrics through a sufficient number of revolutions to bring the high points of each eccentric into coincidence simultaneously.

Although the foregoing description of the triple eccentric miss-cut mechanism has been described with only inferential reference to the P. I. V. 13 and step-gear drive-mechanism 15, it will be understood that these latter speed-change drive-mechanisms are adapted to be used in conjunction with the triple eccentric miss-cut drive-mechanism 16a so that the flying shear may cut unit lengths of stock or lengths of stock as high as nine times a unit length, as well as intermediate lengths of stock of whole or fractional unit lengths by increments corresponding to the infinitesimal adjustments of the speed-ratio unit 13.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a cutting device of the miss-cut type having two shear blades independently movable into and from shearing positions, respectively, in which they cooperate to cut stock between them, the combination of a first rotary eccentric connected with one blade for moving the same to and from its shearing position; a plurality of other complemental eccentrics independently rotatable in stroke-supplemental engagement with each other and drivingly connected with the other blade for moving the same into its shearing position only when the overall stroke of said other eccentrics is substantially at a maximum while the latter turn through a predetermined angular range; and a change-speed drive having an input shaft and independently variable speed output shafts of which said input shaft is drivingly connected with said first eccentric and said output shafts are drivingly connected with said other eccentrics, respectively, to achieve different numbers of miss-cuts by said blades between successive cutting actions thereof.

2. In a flying cutting device of the miss-cut type having a frame carrying a first shear blade and being pivoted on a first rotary eccentric on a shaft for moving said frame into and from a cutting position on rotation of said eccentric, and a gate carrying a second shear blade and being guided by said frame for movement of said second blade into and from cutting relation with said first blade, the combination of a plurality of other complemental eccentrics independently rotatable in stroke-supplemental engagement with each other and drivingly connected with said gate for moving the same into a cutting position only when the overall stroke of said other eccentrics is substantially at a maximum while the latter turn through a predetermined angular range, one of said other eccentrics being rotatable on said shaft, and said blades being in shearing relation with each other when said frame and gate are in their respective cutting positions; and a change-speed drive having an input shaft and independently variable speed output shafts of which said output shafts are drivingly connected with said other eccentrics, respectively, and said input shaft is drivingly connected with said first eccentric, to achieve different numbers of miss-cuts by said blades between successive cutting actions thereof.

3. In a cutting device of the miss-cut type having two shear blades independently movable into and from shearing positions, respectively, in which they cooperate to cut stock between them, the combination of a rotary eccentric element drivingly connected with one blade for moving the same to and from its shearing position; a rotary eccentric disc member; an eccentric sleeve member freely rotatable on the periphery of said disc member and drivingly connected with the other blade for moving the same into its shearing position only when the overall stroke of said eccentric members is substantially at a maximum while the latter turn through a predetermined angular range; and a change-speed drive having an input shaft and two independently variable speed output shafts of which said input shaft is drivingly connected with said eccentric element and said output shafts are drivingly connected with said eccentric members, respectively, to achieve different numbers of miss-cuts by said blades between successive cutting actions thereof.

4. In a cutting device of the miss-cut type having two shear blades independently movable into and from shearing positions, respectively, in which they cooperate to cut stock between them, the combination of a rotary eccentric element drivingly connected with one blade for moving the same to and from its shearing position; a rotary eccentric disc member; a first eccentric sleeve member freely rotatable on the periphery of said eccentric disc member; a second eccentric sleeve member freely rotatable on the outer periphery of said first eccentric sleeve member and drivingly connected with the other blade for moving the same into its shearing position only when the overall stroke of said eccentric members is substantially at a maximum while the latter turn through a predetermined angular range; and a change-speed drive having an input shaft and three output shafts of which the speeds of at least two of said output shafts are independently variable, said input shaft being drivingly connected with said eccentric element and said output shafts being drivingly connected with said eccentric members, respectively, to achieve different numbers of miss-cuts by said blades between successive cutting actions thereof.

5. In a flying cutting device of the miss-cut type having a frame carrying a first shear blade and being provided with spaced legs pivoted on a rotary eccentric element on a shaft for moving said frame into and from a cutting position on rotation of said eccentric element, and a gate carrying a second shear blade and being guided by said frame intermediate the legs thereof for movement of said second blade into and from cutting relation with said first blade, the combination of a first drive sleeve rotatable on said shaft and having identical eccentric members at its opposite ends, respectively; identical eccentric sleeves freely rotatable on the peripheries of said eccentric members, respectively; two other drive sleeves journalled on said first sleeve between said eccentric members and spaced from each other; a radial slot and pin connection between each of said other drive sleeves and the adjacent eccentric sleeve; a first gear mounted on said first sleeve between said other drive sleeves; second identical gears mounted on said other drive sleeves, respectively; connecting rods for drivingly connecting said gate with said eccentric sleeves, respectively, for moving said gate into a cutting position only when the overall stroke of said eccentric members and eccentric sleeves is substantially at a maximum while they turn through a predetermined angular range, said blades being in shearing relation with each other when said frame and gate are in their respective cutting position; and a change-speed drive having an input shaft and two independently variable speed output shafts of which said input shaft is drivingly connected with said eccentric element and said output shafts are drivingly connected with said first and second gears, respectively, for achieving different numbers of miss-cuts by said blades between successive cutting actions thereof.

6. In a flying cutting device of the miss-cut type having a frame carrying a first shear blade and being provided with spaced legs pivoted on a rotary eccentric element on a shaft for moving said frame into and from a cutting position on rotation of said eccentric element, and a gate carrying a second shear blade and being guided by said frame intermediate the legs thereof for movement of said second blade into and from cutting relation with said first blade, the combination of a first drive sleeve rotatable on said shaft and having identical eccentric members at its opposite ends, respectively; first identical eccentric sleeves freely rotatable on the peripheries of said eccentric members, respectively; two second drive sleeves journalled on said first sleeve between said eccentric members and spaced from each other; a radial slot and pin connection between each of said second drive sleeves and the adjacent eccentric sleeve; second identical eccentric sleeves freely rotatable on the outer peripheries of said first eccentric sleeves, respectively; third drive sleeves journalled on said second drive sleeves, respectively; a radial slot and pin connection between each of said third drive sleeves and the adjacent one of said second eccentric sleeves; a first gear mounted on said first sleeve between said second drive sleeves; second identical gears mounted on said second drive sleeves, respectively; third identical gears mounted on said third drive sleeves, respectively; connecting rods for drivingly connecting said gate with said second eccentric sleeves, respectively, for moving said gate into a cutting position only when the overall stroke of said eccentric members and eccentric sleeves is substantially at a maximum while they turn through a predetermined angular range, said blades being in shearing relation with each other when said frame and gate are in their respective cutting positions; and a change-speed drive having an input shaft drivingly connected with said eccentric element, and three independently variable speed output shafts drivingly connected with said first, second and third gears, respectively, for achieving different numbers of miss-cuts by said blades between successive cutting actions thereof.

KARL W. HALLDEN.

References Cited in the file of this patent

UNITED STATES PATENTS

| Number | Name | Date |
| --- | --- | --- |
| 1,875,854 | Cooper | Sept. 6, 1932 |
| 1,969,433 | Smitmans | Aug. 7, 1934 |
| 2,144,308 | Hallden | Jan. 17, 1939 |
| 2,261,007 | Talbot | Oct. 28, 1941 |
| 2,348,958 | Celio | May 16, 1944 |